United States Patent [19]

Karakawa

[11] Patent Number: 4,990,005
[45] Date of Patent: Feb. 5, 1991

[54] PRINTER THAT PRINTS A TABLE OF INFORMATION ABOUT PRINTING EFFECTS USING THE SELECTED PRINTING EFFECTS

[75] Inventor: Hiroyuki Karakawa, Nagoya, Japan

[73] Assignee: Brother Kogyo Kabushiki Kaisha, Aichi, Japan

[21] Appl. No.: 256,855

[22] Filed: Oct. 12, 1988

[30] Foreign Application Priority Data

Oct. 30, 1987 [JP] Japan ................................ 62-276904
Oct. 30, 1987 [JP] Japan ................................ 62-276905

[51] Int. Cl.$^5$ .............................................. B41J 5/30
[52] U.S. Cl. ....................................... 400/76; 400/83; 400/703
[58] Field of Search .................... 400/76, 83, 703, 704

[56] References Cited

U.S. PATENT DOCUMENTS

| | | | |
|---|---|---|---|
| 4,556,959 | 12/1985 | Allen | 400/70 |
| 4,616,946 | 10/1986 | Murata | 400/704 |
| 4,648,047 | 3/1987 | Berkland | 400/70 |
| 4,698,624 | 10/1987 | Barker | 400/61 |
| 4,929,104 | 5/1990 | Yokoi | 400/605 |

FOREIGN PATENT DOCUMENTS

| | | | |
|---|---|---|---|
| 59-59487 | 4/1984 | Japan | 400/703 |
| 60-15185 | 1/1985 | Japan | 400/61 |
| 147378 | 8/1985 | Japan | 400/703 |
| 61-123565 | 6/1986 | Japan | 400/703 |
| 171378 | 8/1986 | Japan | 400/703 |
| 117773 | 5/1987 | Japan | 400/703 |

Primary Examiner—David A. Wiecking
Assistant Examiner—Steven S. Kelley
Attorney, Agent, or Firm—Oliff & Berridge

[57] ABSTRACT

A printer that can print a table of information about printing effects using the printing effects selected in an effects setting mode. For example, if the "emphasized" style is selected, a table with a fixed description of the printing effects is printed using the "emphasized" effect so that the printing effect can be confirmed visually. Further, if the printed effects deviate from the information in the table of printing effects, abnormalities of a memory or such are easily recognized.

5 Claims, 8 Drawing Sheets

0:SIZE
- 2=PROPORTIONAL DESELECTED
- 3=DOUBLE WIDTH SELECTED
- 4=DOUBLE HEIGHT DESELECTED

1:ATTRIBUTE
- 1=EMPHASIZED SELECTED
- 2=SUPERSCRIPT DESELECTED
- 3=SUBSCRIPT DESELECTED
- 4=UNDERLINE SELECTED
- 5=OVERLINE DESELECTED

FIG. 6

0:SIZE . . . . . . .
            2-PROPORTIONAL    DESELECTED
            3-DOUBLE WIDTH    DESELECTED
            4-DOUBLE HEIGHT   DESELECTED

1:ATTRIBUTE . . . . . . .
            1-EMPHASIZED      SELECTED
            2-SUPERSCRIPT     DESELECTED
            3-SUBSCRIPT       DESELECTED
            4-UNDERLINE       DESELECTED
            5-OVERLINE        DESELECTED

PRINTER THAT PRINTS A TABLE OF INFORMATION ABOUT PRINTING EFFECTS USING THE SELECTED PRINTING EFFECTS

BACKGROUND OF THE INVENTION

The present invention relates to a printer that is used by being connected to an external device, such as a word processor or a personal computer.

Prior to the present invention, printers have employed printing conditions such as character style and printing pitch in response to printing data or control codes input from a personal computer or such. Further, some printers are capable of setting the printing conditions by operation of panel switches provided on the printer itself. The printing conditions set as described above are stored as flags in a storing means, such as a random-access memory (RAM), provided on the printer so that the printing may be executed according to the selected printing conditions.

When the printing is performed by a printer, confirmation of the printing conditions is useful. In the case of a printer having a display unit, the printing conditions to be confirmed are displayed on the display unit. On the other hand, in the case of a printer without a display, like the unit disclosed in Published Unexamined Patent Application Nos. 59-59487 and 60-15185, the printing conditions to be confirmed are printed as a fixed description on a printing paper. In a printer without the functions disclosed in Published Unexamined Patent Application No. 61-123565, confirmation is impossible except by printing some of printing data.

However, in the printers that display the printing conditions on the display unit and that print the printing conditions as the fixed description on the printing paper, the printing conditions are difficult to visually understand, so an operator is apt to misunderstand them. Therefore, the printing of the printing data must precede confirmation of whether the printing is proper or not. In addition, printing may deviate from the printing conditions due to an abnormality of a memory or such. In these conventional printers, the printing must actually be performed before the abnormality can be discovered.

Alternatively, a test printing facilitates a visual understanding, but when the printed appearance deviates from the printing conditions due to an abnormality of the memory or such, the operator cannot discover the abnormality because the printing conditions are not printed. As a result, an undesired printing is conducted.

SUMMARY OF THE INVENTION

An object of the invention is to provide a printer that is capable of visually confirming printing conditions.

Another object of the invention is to provide a printer that is capable of confirming whether or not correct printing conditions are properly set.

The foregoing objects are attained by a printer that displays the printing effects by printing information about the printing effects using the selected printing effects comprising: a printing means that prints the characters on the paper according to the printing effects; a setting means that sets the printing effects; a storing means that stores information about the printing effects; and a printing control means that controls the printing means so it prints a description of the printing effects using the selected printing effects.

Figure 1:
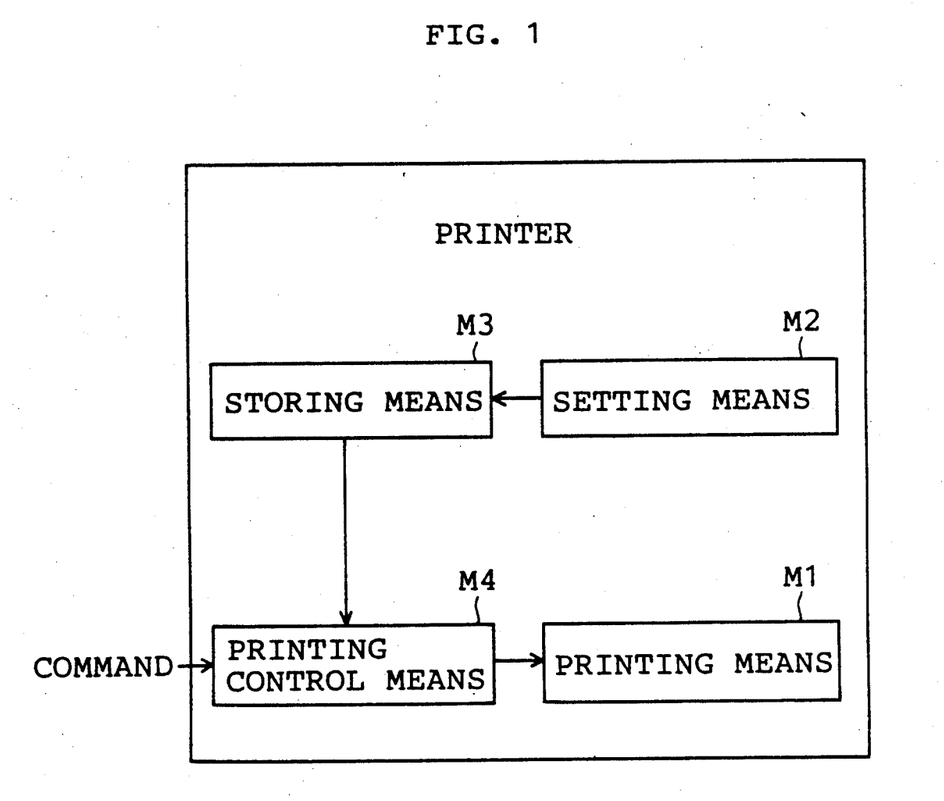
FIG. 1 is a basic block diagram of a printer of the present invention.

According to the present invention, as shown in FIG. 1, when the printing control means M4 makes the printing means M1 print information of the printing effects stored in the storing means M3 in response to a command operation, the information about the printing effects is printed by words with an appearance implemented by the printing effects. Accordingly, the printing effects as well as the information of the printing effects can be observed and confirmed, thus revealing any inconsistency that may exist between the actual printing effects and the intended printing effects.

The printing pitch information refers to character spacing, line feed width and such, while the character style information refers not only to character style, but to size such as pica, elite, proportional, double width, double height, condense, superscript and subscript, and to attribute such as underline, overline and emphasized.

BRIEF DESCRIPTION OF THE DRAWINGS

Other objects and features of the invention will become apparent to those skilled in the art as the disclosure is made in the following description of a preferred embodiment of the invention, as illustrated on the accompanying sheets of drawings, in which.

DETAILED DESCRIPTION OF THE PREFERRED EMBODIMENT

Hereinafter, a preferred embodiment of the present invention will be described in detail with reference to the drawings.

Figure 2:
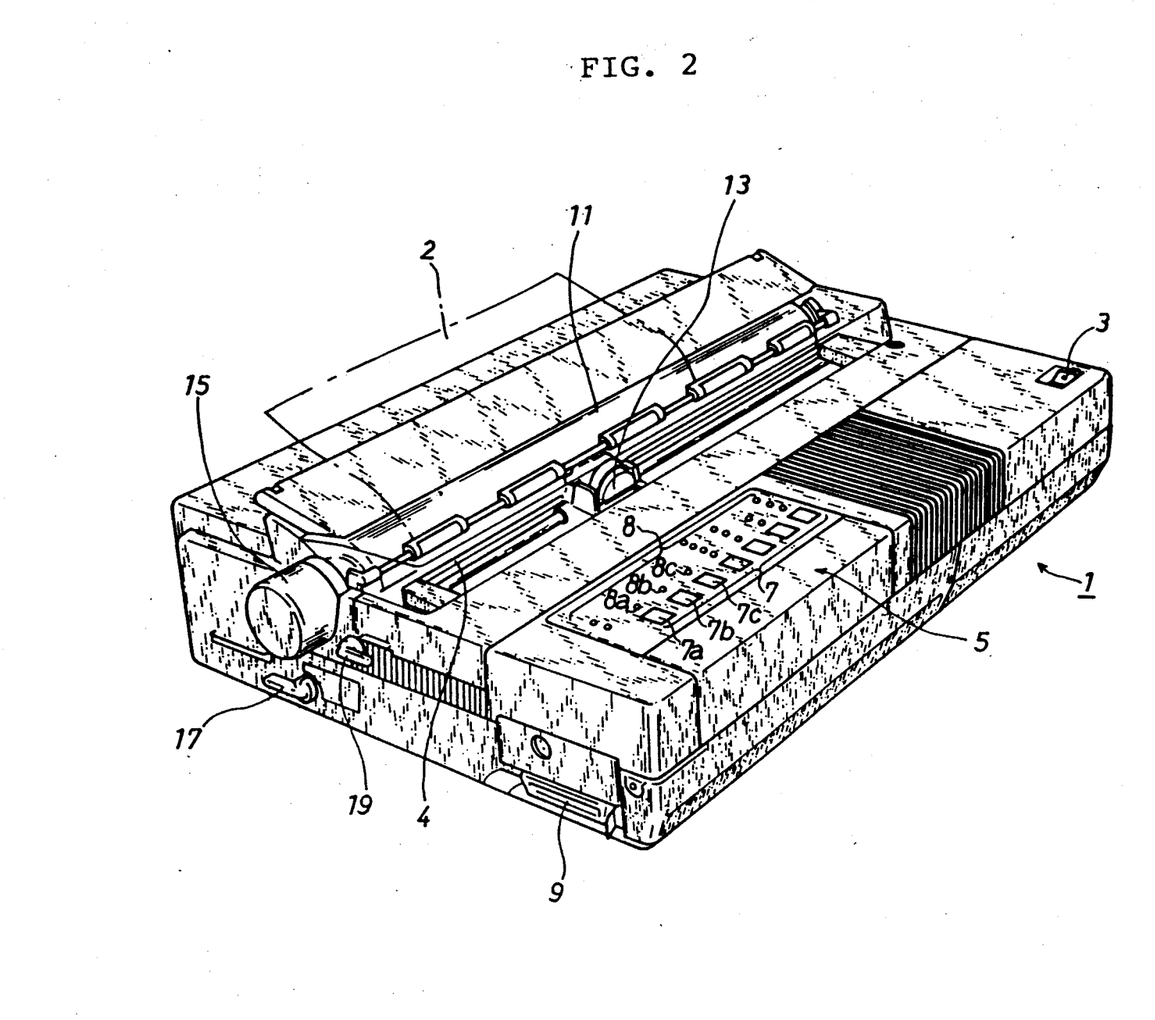
FIG. 2 is a schematic, perspective view of a printer in an embodiment of the present invention.
Figure 3:
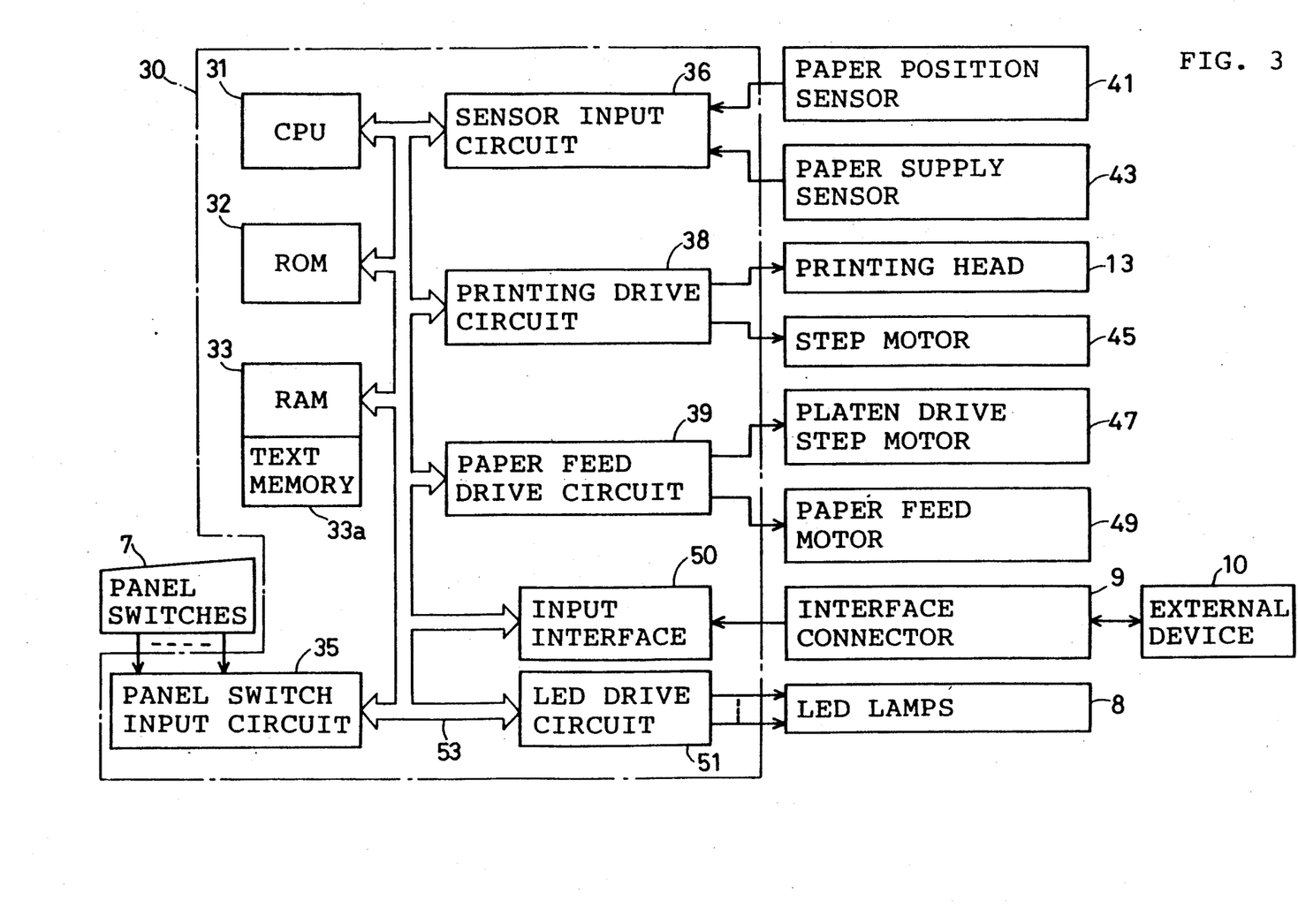
FIG. 3 is a block diagram of a printing control unit for the printer shown in FIG. 2.

FIGS. 2 and 3 show a printer 1 in which a printing control unit 30 is actuated by turning on a power switch 3. Panel switches 7 on a console panel 5 on an upper surface of the printer 1 are operated to select a printing mode, a test printing mode, an effects table printing mode or an effects setting mode. Then, the selected mode is performed, and the selections are simultaneously displayed on light-emitting-diode lamps (LED lamps) 8. For example, if the printing mode is selected, printing is performed according to data input from an external device 10 which is connected to an interface connector 9 provided on a side surface of the printer 1. At this time, a platen drive step motor 47 drives a platen 11 to feed printing paper 2 to a predetermined position. Subsequently, a step motor 45 transversely moves a printing head 13 that prints on the printing paper 2 via an ink ribbon 4 according to the input data.

If the test printing mode is selected, the step motor 45 and the printing head 13 execute the test printing on the printing paper 2 in a preset order and in a preset format according to a dot pattern for each alphabet, numeral or chinese character stored in a read-only memory (ROM) 32. Similarly, if the effects table printing mode is selected, information about the printing effects set by operation of the panel switches 7 in the effects setting mode is printed in a preset order using the selected printing pitch and character style. Further, the printer 1 includes a platen knob 15 for manually adjusting the platen 11, a lever 17 for setting a pressure bar to the printing paper 2, and a lever 19 for adjusting the printer 1 to the thickness of the printing paper 2.

The printing control unit 30, in this embodiment a microcomputer, includes: a central processing unit (CPU) 31; the ROM 32 for storing control programs, data, dot patterns for alphabetic, numeric and Chinese characters; and a RAM 33. The CPU 31, following a program stored in the ROM 32, receives a data signal from a panel switch circuit 35 and from a sensor input circuit 36, and drives a printing drive circuit 38 and a paper feed drive circuit 39 for various processes. The sensor input circuit 36 receives a signal from a paper position sensor 41 and from a paper supply sensor 43. Further, the printing drive circuit 38 sends a drive signal to the printing head 13 and to the step motor 45, and the paper feed drive circuit 39 sends a drive signal to the platen drive step motor 47 and to a paper feed motor 49. An input interface 50 receives printing data from the external device 10 via the interface connector 9. A light-emitting-diode drive circuit (LED drive circuit) 51 turns on the LED lamps 8 corresponding to the selected modes and such. Components, such as the CPU 31, the ROM 32, the RAM 33, and the input interface 50 are interconnected by a bus line 53.

Main process steps controlled by the printing control unit 30 are explained below with reference to flowcharts in FIGS. 4A through 4D.

Figure 4A:
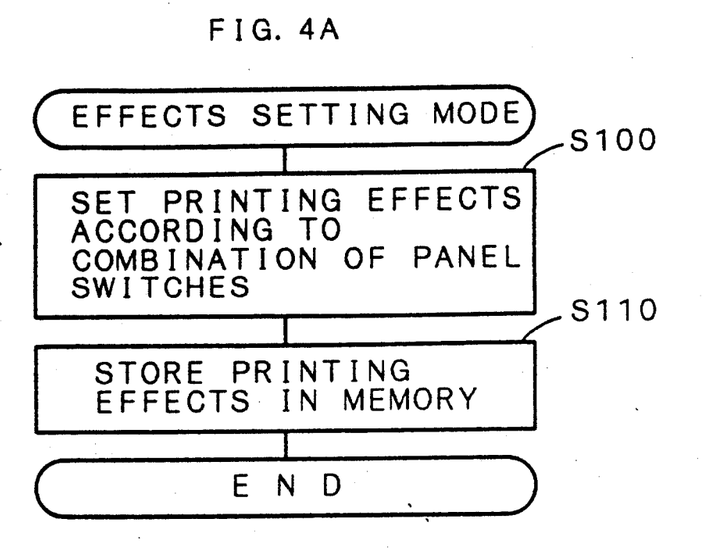
FIG. 4A is a flowchart illustrating process steps of an effects setting mode in the printing control unit.

When the effects setting mode is selected by operation of the panel switches 7, process steps of the effects setting mode start as shown in FIG. 4A. Printing effects are set by turning on some combination of the panel switches 7, which serve as printing effects selecting switches, on at step 100.

Details of the printing effects are shown in Table 1.

TABLE 1

| Categories | Effects |
|---|---|
| 0 Size | 0 pica/elite |
| | 1 condense |
| | 2 proportional |
| | 3 double width |
| | 4 double height |
| | . |
| | . |
| | . |
| | 8 |
| 1 Attribute | 0 draft |
| | 1 emphasized |
| | 2 superscript |
| | 3 subscript |
| | 4 underline |
| | 5 overline |
| | . |
| | . |
| | 8 |
| 2 Page Length | 0 length in inches |
| | . |
| | . |
| | 8 |
| 3 Condition | 0 skip perforation |
| | 1 paper end detector |

TABLE 1-continued

| Categories | Effects |
|---|---|
| | 3 Scandinavian characters |
| | . |
| | . |
| | 8 |
| 8 Font | 0 Gothic/Prestige/Quadro |
| | . |
| | . |
| | 8 |

These categories and effects are selected sequentially, that is, using the panel switches 7, first a category is selected, and then the effects for that category are selected. The selected effects are recorded as bits in the RAM 33 at step 110. The selected printing effects may be stored in a back-up RAM or an electrically programmable, read only memory (EPROM) to be preserved therein, even if the power switch 3 is turned off.

The panel switches 7—an on-line switch 7a for normally changing to on line or off-line the printer 1 connected to the external device 10; a line-feed switch 7b for normally feeding the paper 2 one line; and a top-of form switch 7c for normally loading the paper 2 to the top of form —are operated as explained below with reference to FIG. 4E.

At step 500, the CPU 31 determines whether the on-line switch 7a and the line-feed switch 7b are simultaneously pressed. If the answer is NO, the process step remains in the printing mode of step 510, but if the answer is YES, the CPU 31 switches the printer 1 into the effects setting mode at step 520.

In the effects setting mode, an LED 8a has four states: OFF, low-speed flicker (FL1), high-speed flicker (FL2) and ON. An LED 8b and an LED 8c each have three states: OFF, ON, and FL1. At step 530, the first LED 8a displays FL1, indicating that the categories are being selected, and the other LEDs 8b and 8c indicate the category number. At first, both LEDs 8b and 8c are OFF, indicating category number "0" as shown in Table 2. If the line-feed switch 7b is pressed at step 540, the category number is increased by one at step 545 and the LED display is updated at step 530. In other words, when the line-feed switch 7b is pressed once, the LEDs 8b and 8c become OFF and ON, respectively, thus displaying category number "1". After reaching category number "8", the next pressing of the line-feed switch 7b returns the LEDs 8b and 8c to category number "0". Once a desired category number is chosen, the top-of-form switch 7c is pressed at step 550 to proceed to the effect display at step 560.

To return to the printing mode without selecting any categories, the top-of-form switch 7c is not operated at step 550, but the on line switch 7a is pressed at step 570.

After a category is selected, the first LED 8a displays FL2, indicating that the effects are being selected, while the LEDs 8b and 8c indicate effect number at step 560. At first, both LEDs 8b and 8c are OFF, indicating effect number "0". If the line-feed switch 7b is pressed at step 580, the effect number is increased by one at step 585. In other words, when the line-feed switch 7b is pressed once, the LEDs 8b and 8c become OFF and ON, respectively, which displays effect number "1". After reaching effect number "8", the next pressing of the line-feed switch 7b returns the LEDs 8b and 8c to effect number "0". When a desired effect number is displayed, the top-of-form switch 7c is pressed at step 590 to store the number at step 600.

To return to the category selection at step 530 without selecting any effects, the top-of-form switch 7c is not operated at step 590, but the on-line switch 7a is pressed at step 610. At step 630, the LEDs 8b and 8c display the category number "0" again.

TABLE 2

| Effect number | Category number | |
|---|---|---|
| | LED 8b | LED 8c |
| 0 | OFF | OFF |
| 1 | OFF | ON |
| 2 | OFF | FL1 |
| 3 | ON | OFF |
| 4 | ON | ON |
| 5 | ON | FL1 |
| 6 | FL1 | OFF |
| 7 | FL1 | ON |
| 8 | FL1 | FL1 |

Figure 4B:
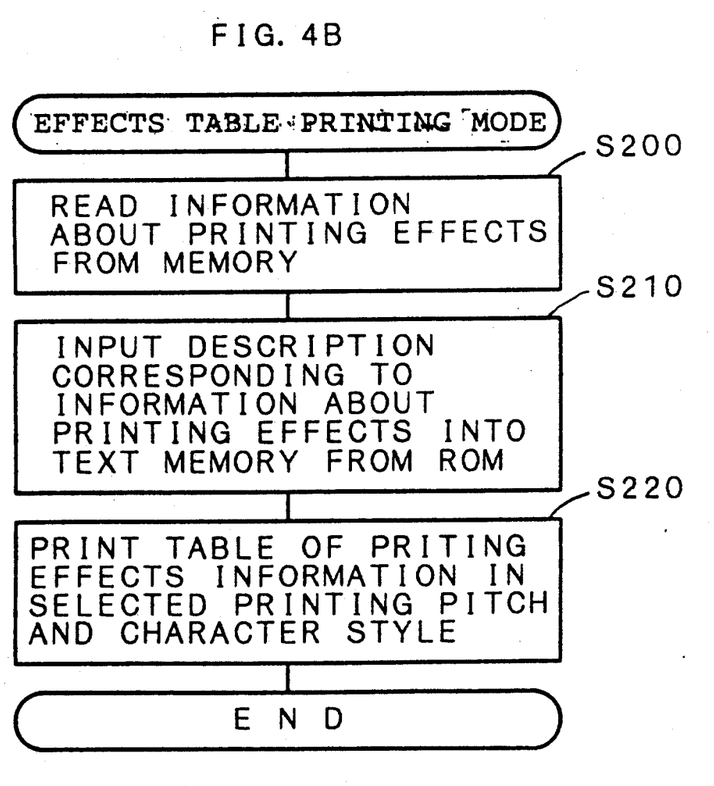
FIG. 4B is a flowchart illustrating process steps of an effects table printing mode in the printing control unit.

Similarly, when the effects table printing mode is selected by operation of the panel switches 7, process steps shown in FIG. 4B begin. Information about the printing effects set by the effects setting mode is read from the RAM 33 as bits at step 200. A fixed description of the printing effects is read from the ROM 32 into a text memory 33a in the RAM 33 at step 210. For example, if the "emphasized" bit is set, the character string "EMPHASIZED SELECTED" is read from the ROM 32 into the text memory 33a.

Figure 5:
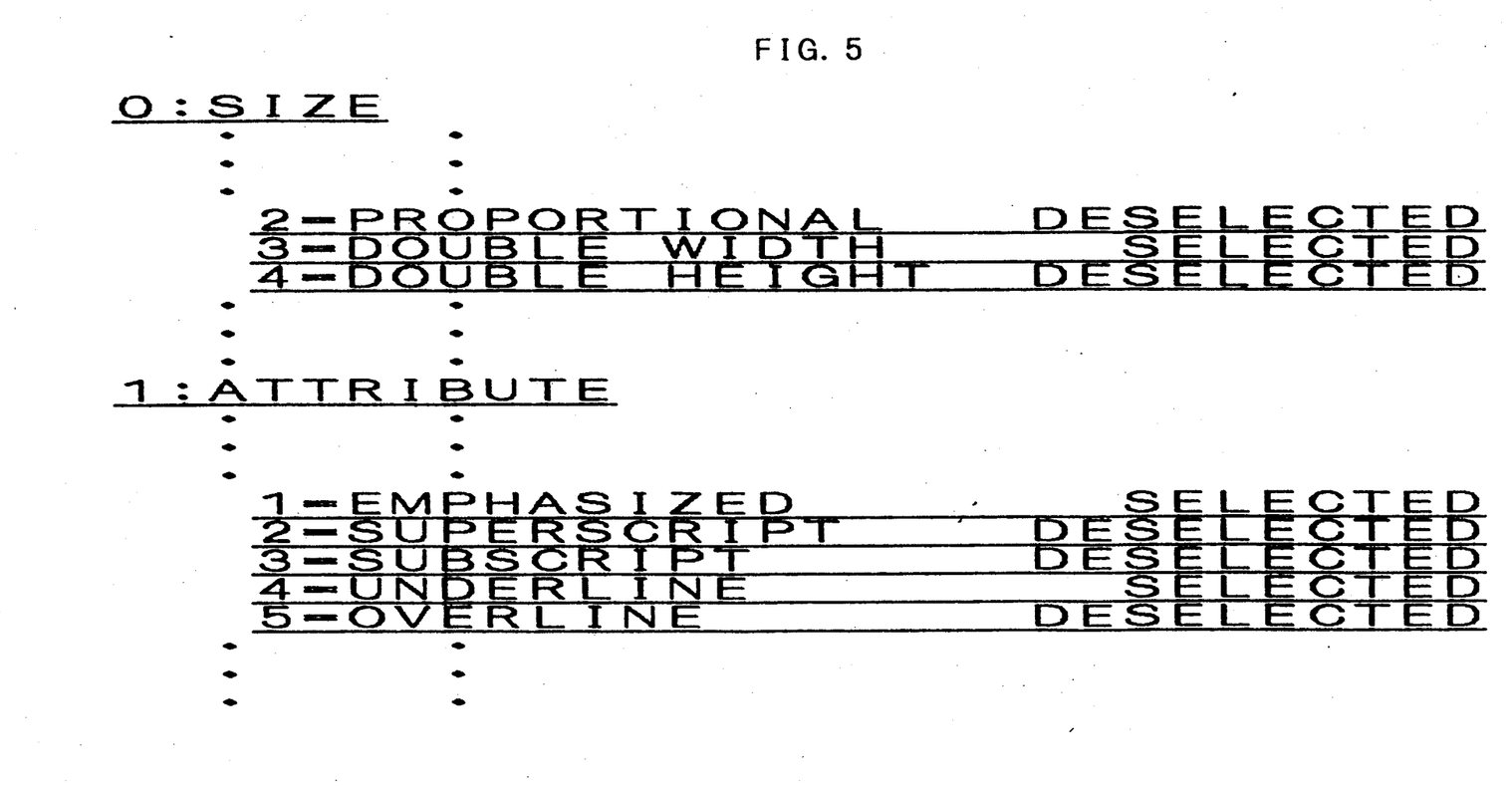
FIGS. 5 and 6 are output examples of the printing control unit corresponding to the printer in FIG. 2.
Figure 6:
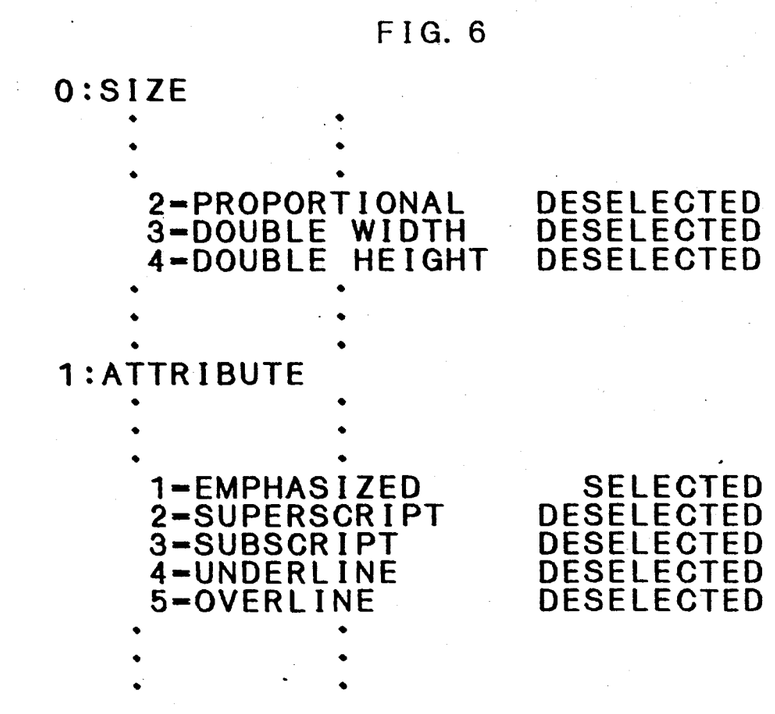

At step 220, the character string in the text memory 33a is printed in the printing pitch and the character style corresponding to the printing effects stored in RAM 33. In other words, as shown in FIG. 6, if the "emphasized" style is selected, a table of the effects listed in Table 1 and their respective selection statuses is printed in the "emphasized" style. If other categories and effects are selected in addition to the "emphasized" style, printing is performed using all of the selected effects. As shown in FIG. 5, for example, the "double width" and "underline" are selected together with the "emphasized" style, the table is printed using the effects of the "emphasized", "double width" and "underline" styles.

Figure 4C:
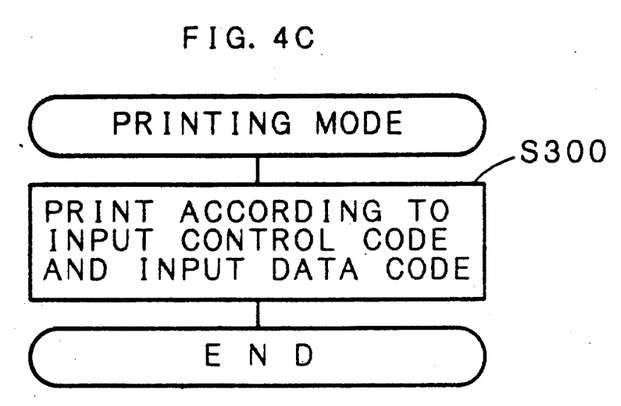
FIG. 4C is a flowchart illustrating a process step of a printing mode in the printing control unit.

When the printing mode, which prints data input from the external device 10 via the interface connector 9, is selected by operation of the panel switches 7, the process step shown in FIG. 4C starts. Printing is executed according to a control code and a data code input from the external device 10 at step 300.

Figure 4D:
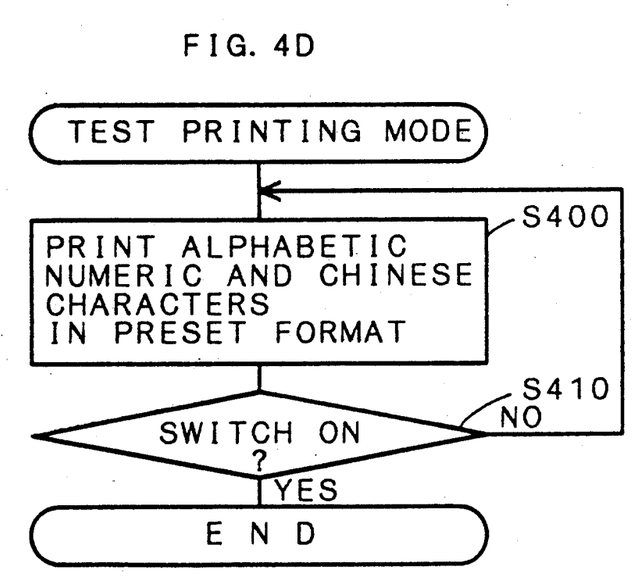
FIG. 4D is a flowchart illustrating process steps of a test printing mode in the printing control unit.
Figure 4E:
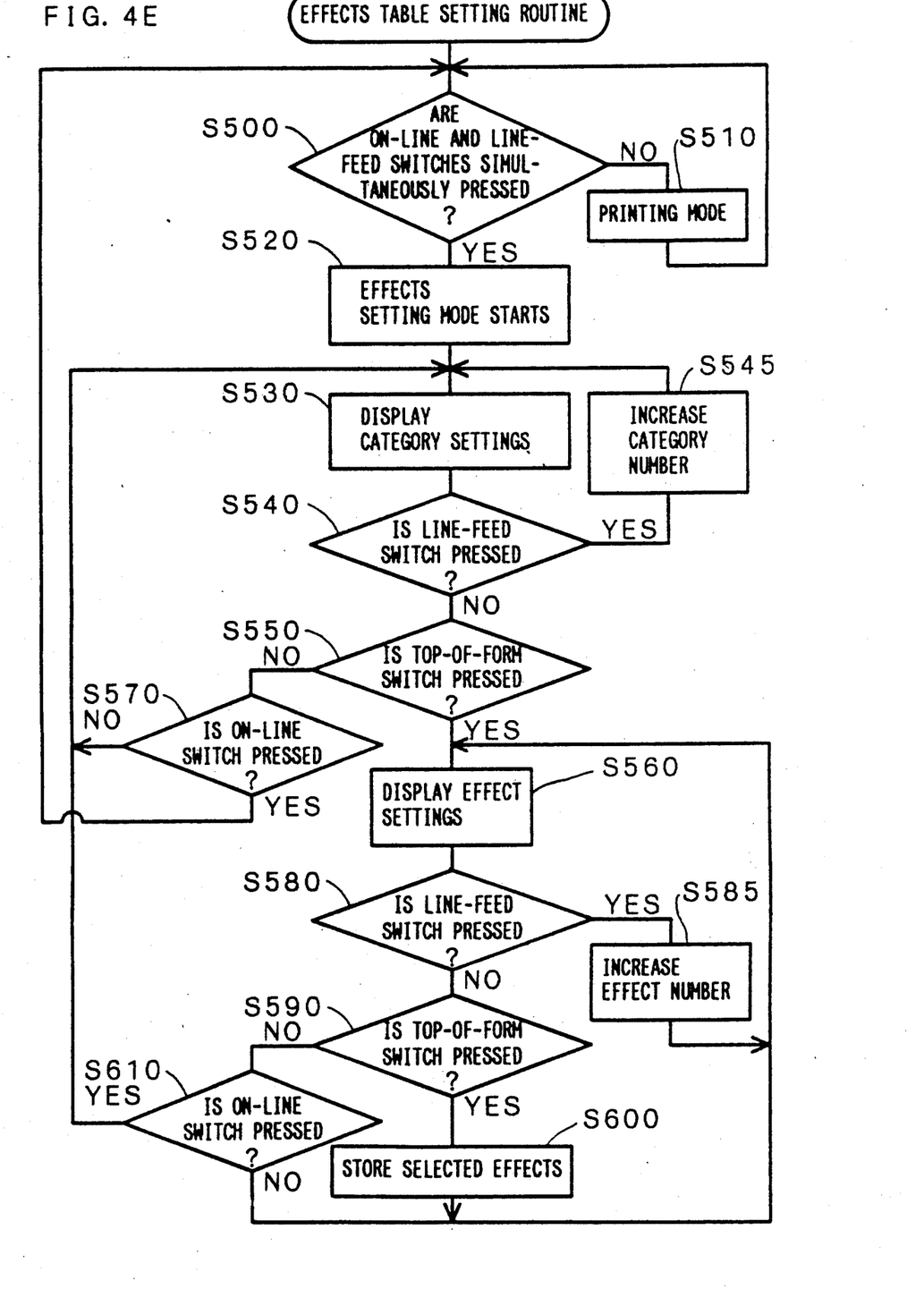
FIG. 4E is a flowchart illustrating process steps of an effects table setting routine in the printing control unit.

When the test printing mode is selected by operation of the panel switches 7, the process steps shown in FIG. 4D start. A dot pattern for alphabetic, numeric and Chinese characters, which are stored in the ROM 32, is printed in a preset format and in a preset order at step 400. At step 410, it is determined whether or not a panel switch for ending the test printing is on. If the answer is NO, process step returns to step 400 so that it may be repeated, but if the answer is YES, the process steps of the test printing end.

In the printer 1 of this embodiment constituted above, the effects table printing mode is selected simply by turning on a preset switch out of the panel switches 7. The information about the printing effects is then printed in a table using the selected printing effects so that the printing effects can be confirmed visually. If the information in the table of printing effects deviates from the printing effects used to print the table, it means an abnormality of a memory or the like has occurred. This makes correction of abnormalities possible before any data is printed. In this embodiment, the printing head 13, the printing drive circuit 38, the paper feed drive circuit 39, the step motor 45, the platen drive step motor 47, and the paper feed motor 49 are equivalent to the printing means M1. Similarly, the panel switches 7 and the panel switch input circuit 35 are equivalent to the setting means M2, the RAM 33 and the text memory 33a to the storing means M3, and the CPU 31 and the ROM 32 to the printing control means M4.

As shown in Table 1, this embodiment can set eighty-one effects, which are sequentially selected. This large number of effects allows a wide range of the printer functions. Further, to increase the number of the categories and effects, more flickering speeds may be set, and flicker patterns like Morse signals may be used.

Obviously, many modifications and variations of the present invention are possible in light of the above teachings. It is therefore to be understood that within the scope of the appended claims, the invention may be practiced otherwise than as specifically described.

What is claimed is:

1. A printer having selectable printing effects that prints a table about the printing effects using the selected printing effects, comprising:
   a printing means for printing characters on paper according to the selected printing effects;
   a setting means for setting the selected printing effects;
   a storing means for storing information about the printing effects; and
   a printing control means for directing the printing means to print a table of information about the printing effects, said printing control means further directing the printing means to print the table itself using the selected printing effects, enabling an operator to verify the selected printing effects by viewing the printing effects that the printing means used to print the table, wherein said setting means comprises a plurality of switching means, the actuation of a first combination of switching means causing said setting means to enter a menu level whereby a plurality of selection levels, each selection level containing a plurality of printing effects, can be selected; the actuation of a second combination of switching means, when said setting means is in the menu level, causing a cycling through the selection levels; the actuation of a third combination of switching means, when in the menu level causing said setting means to enter an effect selection level whereby a plurality of effects within a selected selection level can be selected; the actuation of said second combination of switches, when in the effect selection level, causing a cycling through the effects within a selection level; and the selection of said third combination of switches, when in the effect selection level, causing a selected effect to be stored in the storing means.

2. A printer according to claim 1, wherein the printer further comprises a mode selector means for selecting at least an effects table printing mode to print the information about the printing effects stored in the storing means.

3. A printer according to claim 1, wherein the setting means is used to set at least a character style and a printing pitch as the selected printing effects.

4. A printer according to claim 2, wherein the setting means is used to set at least a character style and a printing pitch as the selected printing effects.

5. A printer according to claim 1, wherein the plurality of switching means comprises an on-line switch, a line-feed switch and a top-of-form switch, wherein the first combination is the simultaneous pressing of the on-line switch and the line-feed switch, the second combination is the pressing of the line-feed switch, and the third combination is the pressing of the top-of-form switch.

* * * * *